(12) United States Patent
Barber (10) Patent No.: US 7,975,977 B2
(45) Date of Patent: Jul. 12, 2011

(54) HEIGHT INDICATOR FOR AN ARTICULATING SUPPORT ARM

(75) Inventor: Peter M. Barber, Fergus (CA)

(73) Assignee: CompX International Inc., Kitchener, Ontario (CA)

( * ) Notice: Subject to any disclaimer, the term of this patent is extended or adjusted under 35 U.S.C. 154(b) by 1070 days.

(21) Appl. No.: 11/625,101

(22) Filed: Jan. 19, 2007

(65) Prior Publication Data

US 2007/0163135 A1    Jul. 19, 2007

Related U.S. Application Data

(60) Provisional application No. 60/759,982, filed on Jan. 19, 2006.

(51) Int. Cl.
*E04G 3/00*    (2006.01)

(52) U.S. Cl. .................................. 248/286.1; 248/918
(58) Field of Classification Search ............... 248/276.1, 248/282.1, 284.1, 286.1, 918; 108/6, 7; 33/503
See application file for complete search history.

(56) References Cited

U.S. PATENT DOCUMENTS

| | | | | |
|---|---|---|---|---|
| 6,021,985 A * | 2/2000 | Hahn | ........................ | 248/286.1 |
| 6,027,090 A * | 2/2000 | Liu | ........................ | 248/281.11 |
| 6,257,538 B1 * | 7/2001 | Pangborn et al. | ........... | 248/284.1 |
| 7,455,270 B2 * | 11/2008 | Maloney et al. | ........... | 248/278.1 |
| 7,523,905 B2 * | 4/2009 | Timm et al. | ................ | 248/284.1 |
| 7,533,859 B2 * | 5/2009 | Blackburn | ................ | 248/286.1 |

* cited by examiner

*Primary Examiner* — Gwendolyn Baxter
(74) *Attorney, Agent, or Firm* — Daryl W. Schnurr (57) ABSTRACT

A height indicator as provided on an articulating support arm at a workstation. The height indicator has a scale and a needle moves up and down the scale as a platform of the support arm is raised or lowered relative to a base.

13 Claims, 8 Drawing Sheets

HEIGHT INDICATOR FOR AN ARTICULATING SUPPORT ARM

Priority claims the benefit of U.S. Provisional Application Ser. No. 60/759,982 filed on Jan. 19, 2006

BACKGROUND OF THE INVENTION

1. Field of the Invention

This invention relates to a height indicator for an articulating support arm that is used to support computer peripherals and the like at a workstation.

2. Description of the Prior Art

It is known to have articulating support arms for keyboards and the like where the angle of the platform on which the keyboard rests is adjustable relative to a base of the support arm. For example, a universal thread can be used to adjust the angle of the platform relative to an elongated member connecting the platform to the base. The universal thread has a scale connected thereto so that the exact angle can be repeated as desired by the same user or different users. The articulating support arm is designed so that once the angle of the platform is set relative to the base, as the platform is moved up and down, the angle relative to the base remains substantially constant as the height of the platform varies.

The articulating support arm is connected to a baseframe that moves in and out so that the keyboard can be stored beneath a desktop or any working surface at a workstation when it is not in use. A particular user may want to place the platform at exactly the same height and angle each time that the keyboard is removed from storage. Alternatively, a particular user may want to place the keyboard at a different height for different tasks such as working from a reclined or standing position. Further, there may be more than one user using the particular keyboard and they may have a desire to set the platform at a different height from other users. Height indicators for the keyboard platform are not known.

SUMMARY OF THE INVENTION

It is an object of the present invention to provide a height indicator on an articulating support arm to indicate a height of the platform relative to the base throughout the full range of movement of the support arm. It is a further object of the present invention to provide a height indicator that is conveniently located and sufficiently precise to allow a user to move the support arm from a first height and to return the support arm to the first height whenever desired.

An articulating support arm is used in supporting one or more components at a workstation. The articulating support arm comprises two elongated members located vertically apart from one another, the elongated members each having two ends. The elongated members are pivotally connected at the ends to brackets connected to a base and platform, the base and platform being located at opposing ends of the elongated members. There are separate pivot axes at each end for each longitudinal member. The support arm has a height indicator thereon to measure a distance that the elongated members move relative to one another when the platform moves up or down relative to the base.

An articulating support arm is used to support one or more components at a workstation. The articulating support arm has a first elongated member with two ends and a base being pivotally connected at an inner end of one of the two ends. A supporting surface is pivotally connected at an outer end of the two ends. A second elongated member is pivotally connected to the base and the supporting surface. The supporting surface and the base are connected to the elongated member so that an angel of the supporting surface to the first elongated member relative to an angle of the base to the first elongated member remains substantially constant as the supporting surface moves up and down relative to the base. The first elongated member has a mechanical height indicator thereon, the height indicator measuring a height of the supporting surface relative to the base.

An articulating support is used in supporting one or more components of a work station. The articulating support arm comprises two elongated members located vertically apart from one another. The elongated members each having two ends and being pivotally connected at each end to brackets connected to a base and a platform. The base and platform are at opposite ends of the elongated members. There are separate pivot axis at each end for each elongated member. The support arm has a height indicator thereon to measure a distance that the elongated members move relative to one another when the platform moves up or down relative to the base.

Figure 1:
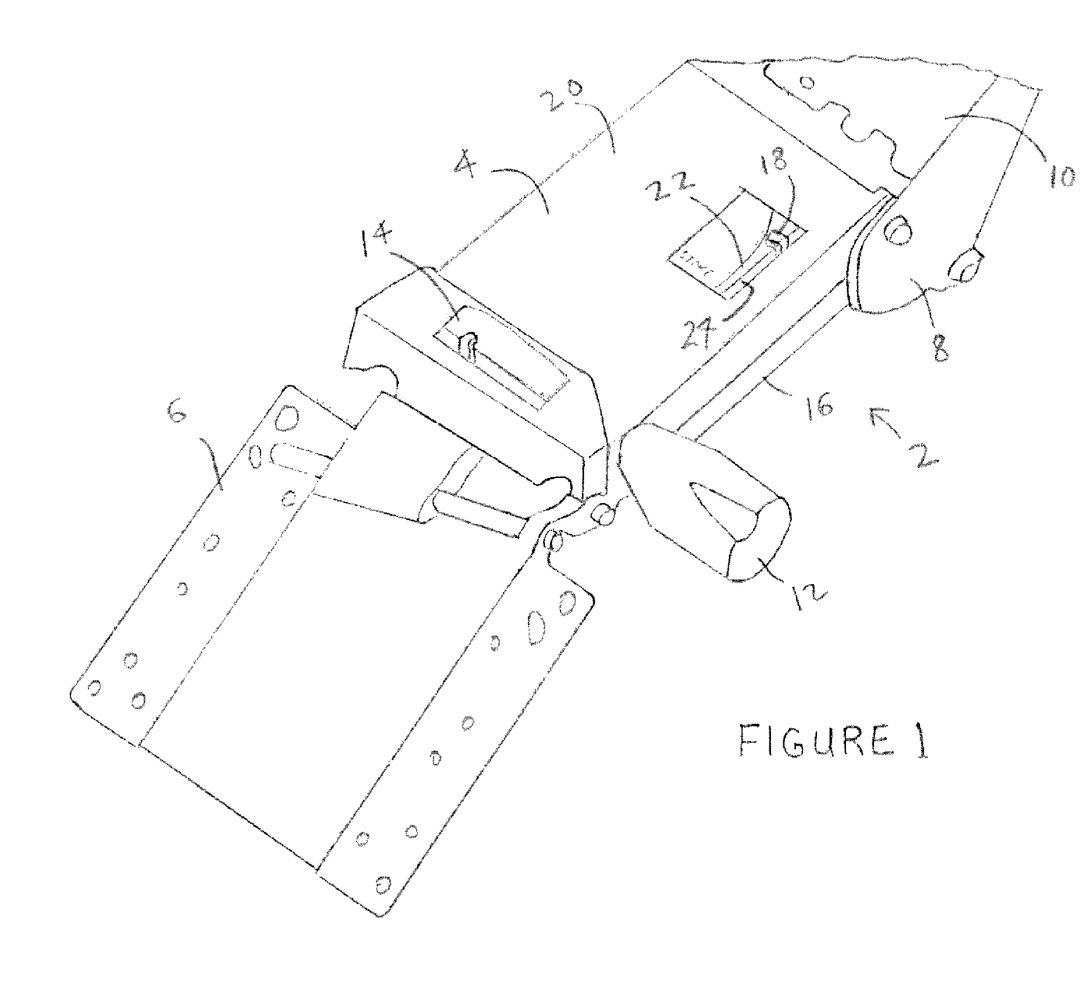
FIG. 1 is a partial perspective view of the support arm showing a scale and height indicator adjacent to the scale.

In FIG. 1, there is shown a partial perspective view of an articulating support arm 2 having a first elongated member 4 that is pivotally connected at either end to brackets 6, 8. The bracket 6 supports a platform for a keyboard and the like (not shown) and the bracket 8 supports a base 10 of the support arm. The base 10 is shaped to be mounted on to a slide plate (not shown) of a baseframe (not shown). A knob 12 is connected to a universal screw (not shown) and can be turned in either direction to change the angle of the bracket 6 relative to the first elongated member 4 and also relative to the base 10. A scale 14 has an indicator thereon that moves as the knob 12 is turned. The first elongated member 4 has a U-shaped cross section and there is a second elongated member that extends beneath the first elongated member 4 and has two arms 17 that are pivotally connected to the brackets 6, 8, beneath the first elongated member 4. The support arm 2 is designed so that the platform (not shown) on the bracket 6 can move up and down relative to the base 10 and the angle of the platform relative to the base 10 will remain substantially constant as long as the knob 12 is not turned regardless of height changes of the platform relative to the base. A height indicator 18 extends onto an upper surface 20 of the first elongated member 4 through a slot. The height indicator 18 moves along a scale 22 as the platform moves up or down relative to the base 10. The height indicator 18 extends through the first elongated member 4 and is pivotally mounted on the second elongated member 16 (the portion of the height indicator 14 beneath the first elongated member 4 is not shown in FIG. 1).

Whenever the support arm is stored beneath a workstation (not shown) to which the baseframe (not shown) is connected, the platform is lowered so that the support arm can slide beneath the workstation. When a user wishes to use the keyboard or other component on the platform, the support arm is pulled outward and then moved upward to a height as desired by the user. The platform could also be moved downward relative to the base, but in most cases, it will be desirable to move the platform upward from a storage position. A user may have a particular height that the user desires to repeat when the support arm is used or a particular user may have more than one height that they desire to use. Alternatively, the support arm might be used by a plurality of users who each have their own preferences as to height. The height indicator 18 allows the user or users to place the platform at a particular height relative to the base, to store or move the platform to a different height and to return the platform to the previous height at any time that the user desires by making reference to the position of the height indicator on the scale 22.

Figure 2:
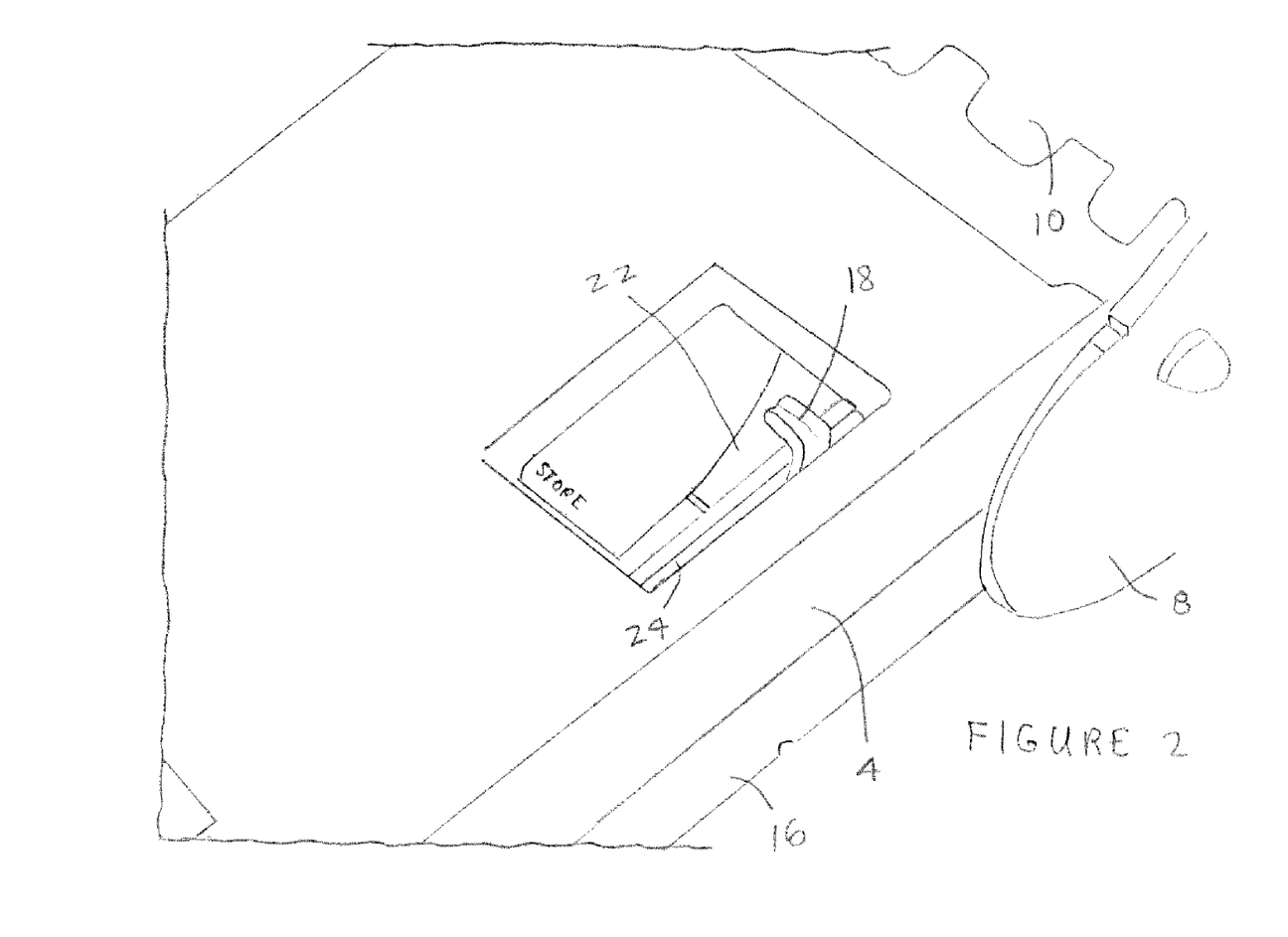
FIG. 2 is an enlarged partial perspective view of the scale and height indicator of FIG. 1.
Figure 3:
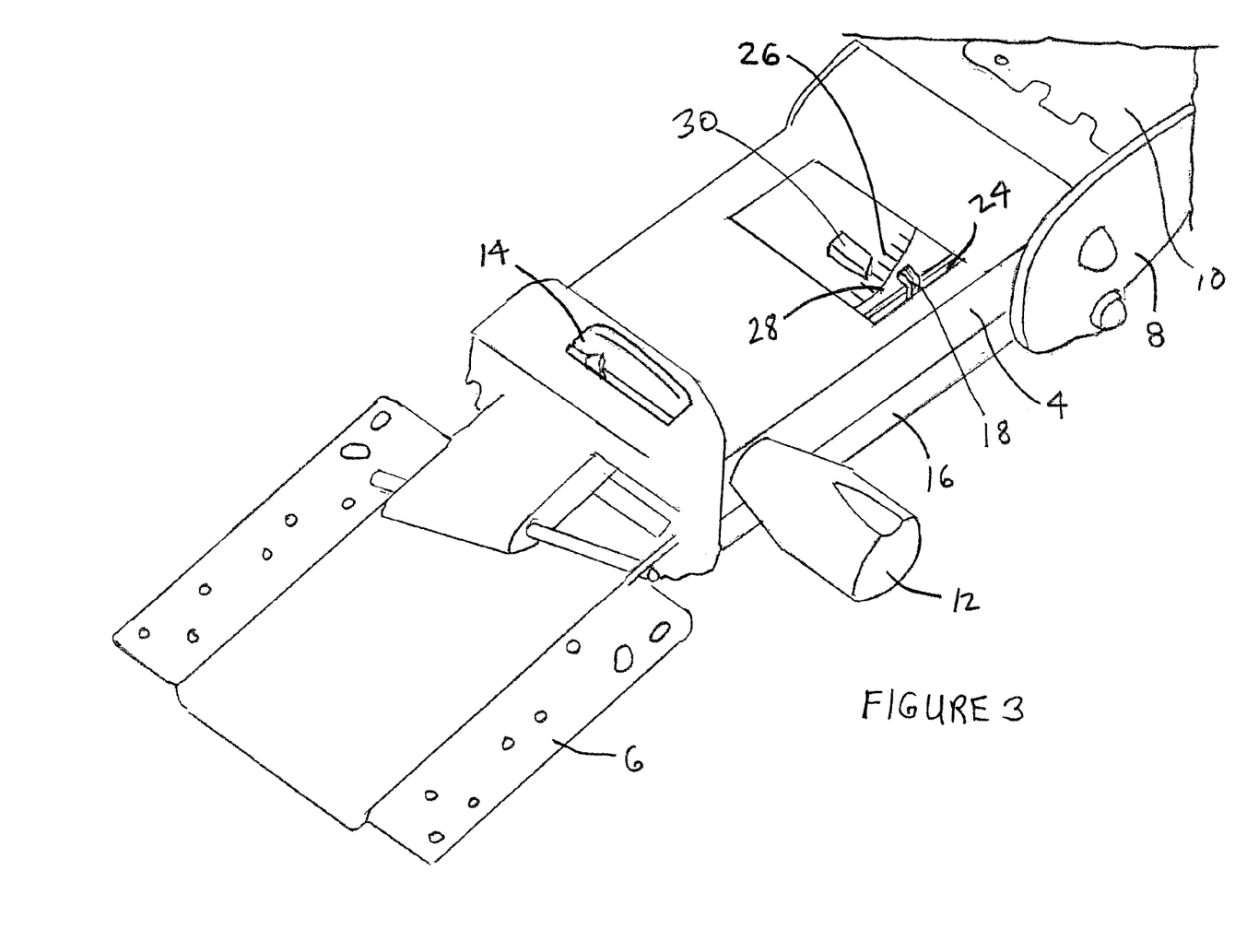
FIG. 3 is a partial perspective view of a height indicator with a slightly different scale from that shown in FIG. 1.
Figure 4:
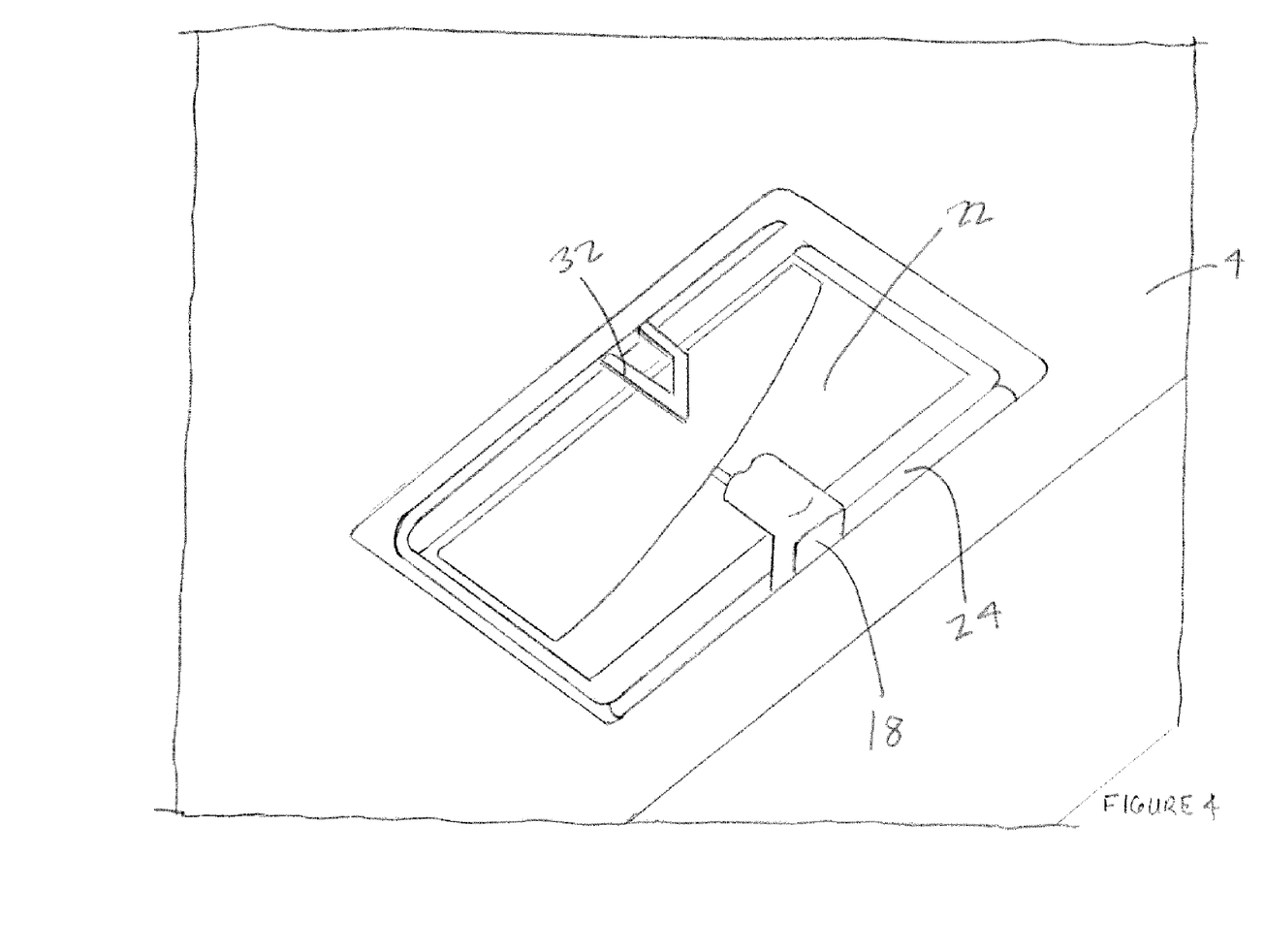
FIG. 4 is an enlarged perspective view of a scale and height indicator having a previous setting indicator.

In FIGS. 2, 3 and 4, the same reference numerals are used for those components that are identical to the components of FIG. 1. In FIG. 2, the height indicator 18 and scale 22 are identical to those same components in FIG. 1. The height indicator 18 extends through a slot 24. As the platform (not shown in FIG. 2) is lowered, the height indicator moves along the scale 22 toward the word "STORE". The height indicator 18 extends from above the surface 20 of the first elongated member 4 to beneath the surface 20 through the slot 24.

In FIG. 3, a scale 26 has more indicator lines 28 thereon as well as a previous setting indicator 30. The previous setting indicator can be moved manually to any desired location on the scale. In all other respects, the support arm 2 shown in FIG. 3 is identical to the support arm 2 shown in FIG. 1.

In FIG. 4, there is a previous setting indicator 32 used with the scale 22. The previous setting indicator 32 can be moved manually to any location along the scale with which it is used. The previous setting indicator 32 will remain in a fixed location regardless of the movement of the support arm. The height indicator 18 moves along the scale in either direction depending solely on the movement of the platform (not shown in FIG. 4) relative to the base (not shown in FIG. 4). A height indicator can have more than one previous setting indicator located on the scale. When a user desires to return to a previous height, the user can simply adjust the support arm until the height indicator 18 is opposite to the previous setting indicator 32. Alternatively, if the scale has enough division lines on it, the user can adjust the height until the height indicator is opposite the desired division indicator on the scale. The scale 22 shown in FIG. 4 does not have the word "STORE" shown thereon. The height indicator 18 move toward the left hand end of the scale 22 (when viewed from the angle shown in FIG. 4 when the platform (not shown in FIG. 4) is being lowered.

Figure 5:
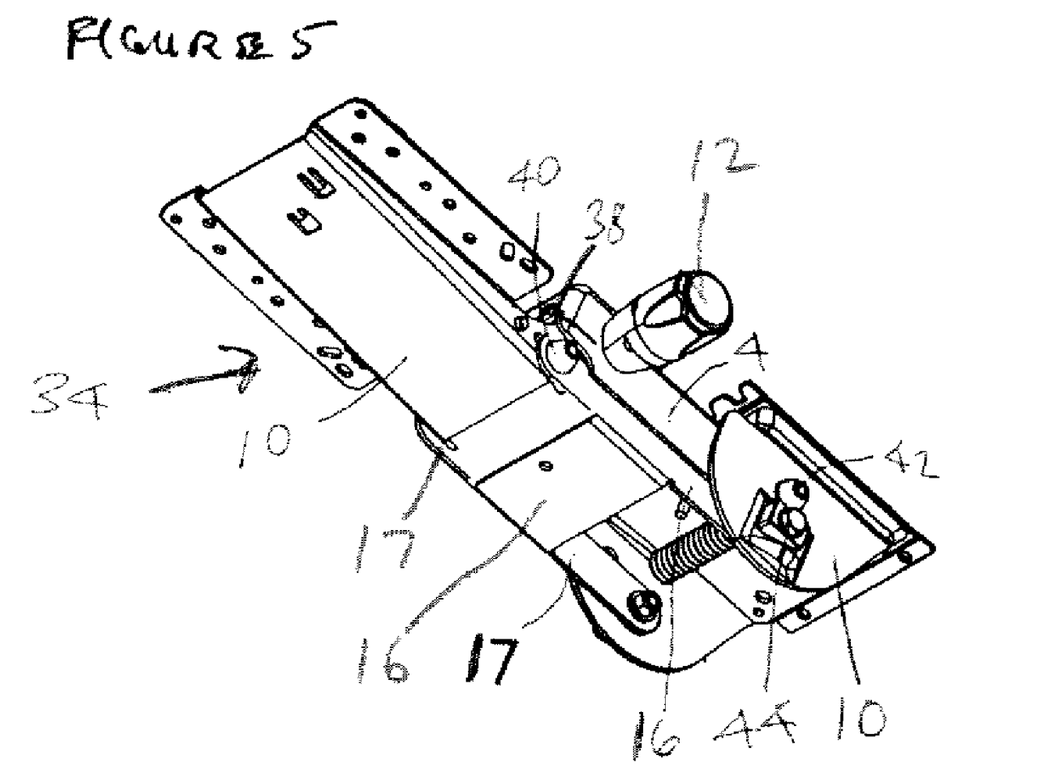
FIG. 5 is a perspective view of an underside of a support arm without a height indicator.

FIG. 5 is a perspective view of an underside of a support arm 34, which is identical to the support arm 2 except that the support arm 34 does not have any height indicator mounted thereon. It can be seen that the second elongated member 16 extends beneath the first elongated member 4. The first elongated member 4 is pivotally connected to the brackets 6, 10 and the second elongated member 16 is also pivotally connected to the brackets 6, 10, but the two elongated members are connected to different pivot axes. There are two pivot axes 38, 40 on the bracket 6 and two pivot axes 42, 44 on the bracket 10. The first elongated member 4 pivots on the pivot axes 38, 42 and the second elongated member 16, through arms 17, pivots on the pivot axes 40, 44. The second elongated member 16 is connected into both sides of the bracket 10 along the pivot axes 44.

Figure 6:
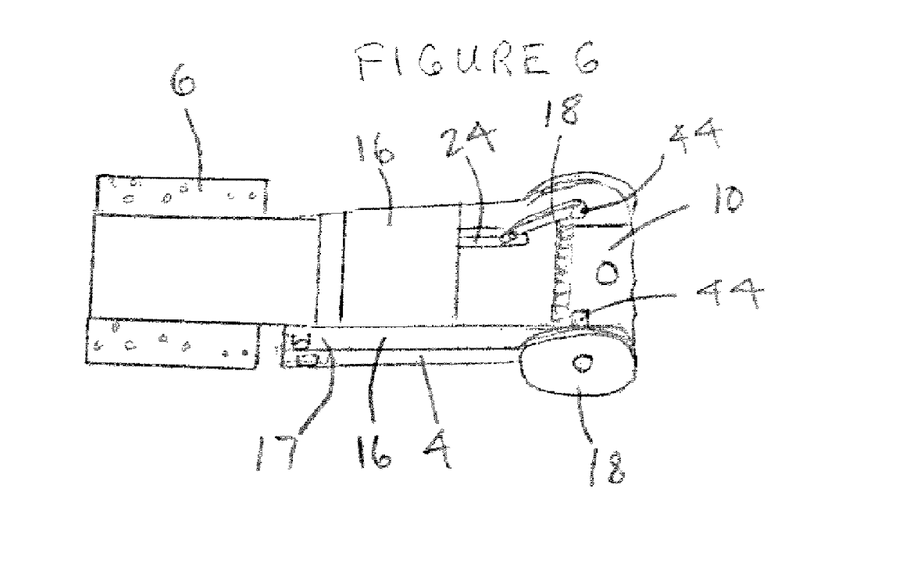
FIG. 6 is a perspective view of an underside of a support arm with a height indicator.
Figure 7:
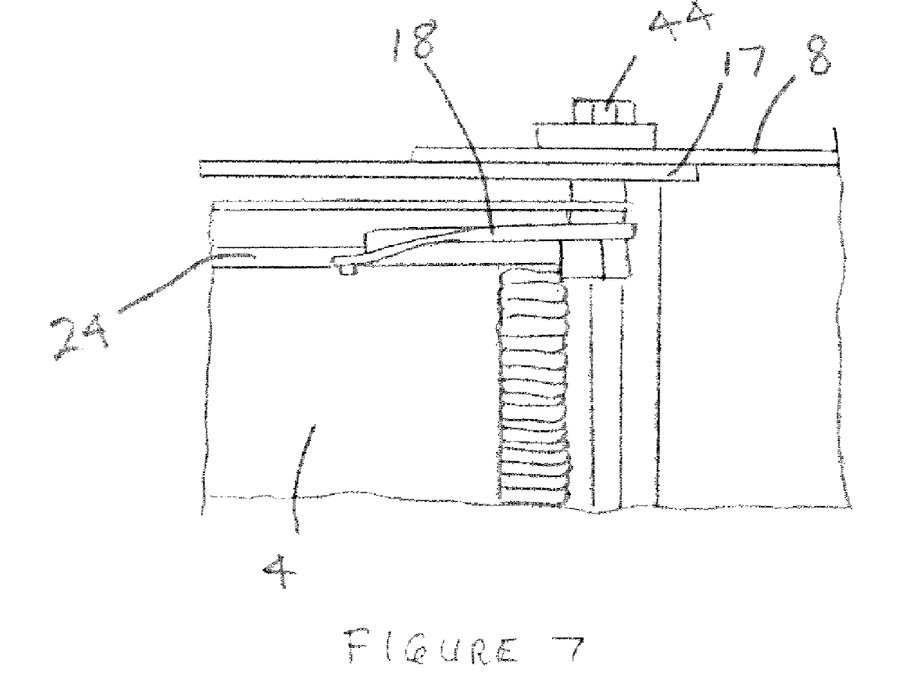
FIG. 7 is an enlarged partial view of an underside of the support arm with the height indicator.
Figure 8:
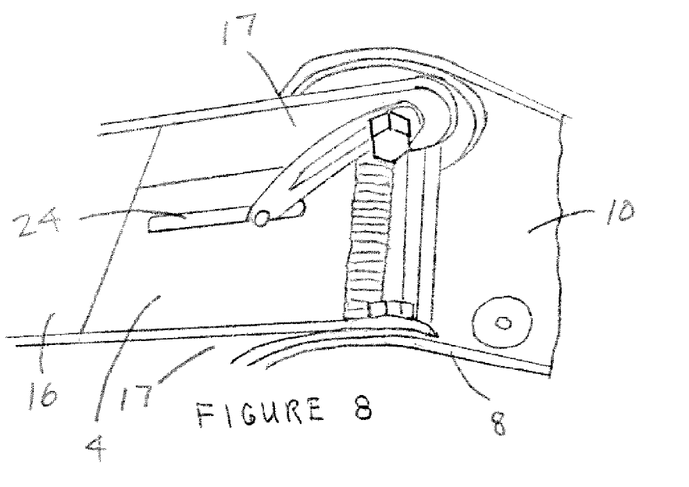
FIG. 8 is an enlarged partial perspective view of an underside of the support arm with the height indicator when viewed from an angle.

In FIGS. 6, 7 and 8, the same reference numerals are used as those used in FIGS. 1 to 5 for those components that are identical. It can be seen that the height indicator 18 is pivotally mounted on the pivot axis 44 of the second elongated member 16 and extends upward through the slot 24. As the height of the platform (not shown) increases or decreases relative to the base (not shown in FIGS. 5, 6 and 7), the indicator 18 moves along the scale. The indicator 18 measures the distance that the first elongated member 4 moves relative to the second elongated member 16. The indicator 18 does not have to be located on the pivot axis 44. The indicator 18 can be pivotally mounted at any desirable location along the second elongated member 16. For example, the height indicator 18 can be mounted at the pivot axis 40. The height indicator must be mounted in such a position that it can extend upward so that its upper end is above the surface 20 (not shown in FIGS. 5, 6 and 7) of the first elongated member 4.

Figure 9:
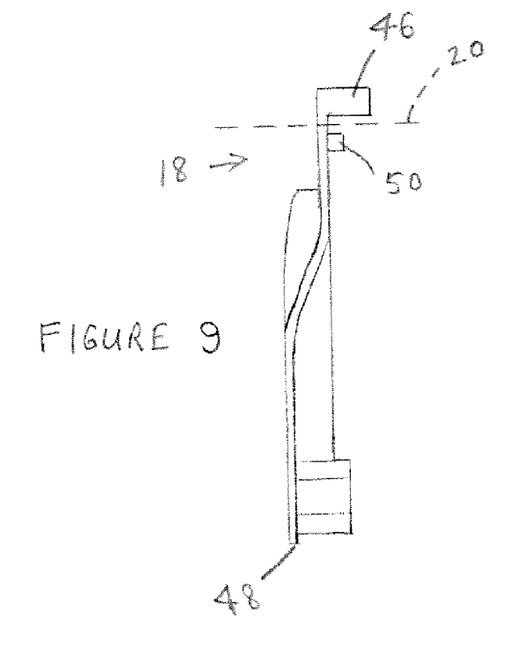
FIG. 9 is a schematic edge view of the height indicator.

In FIG. 9, there is shown a schematic front view of the height indicator 18. The dotted line represents the surface 20. It can be seen that the height indicator 18 has an upper end 46 and a lower end 48 and nodule 50 extends outward from the height indicator 18 on a side opposite to the upper end 46. As the surface 20 moves relative to the indicator 18, the combination of the upper end 46 and the nodule 50 cause the upper end 46 to move along the scale (not shown in FIG. 9).

Figure 10:
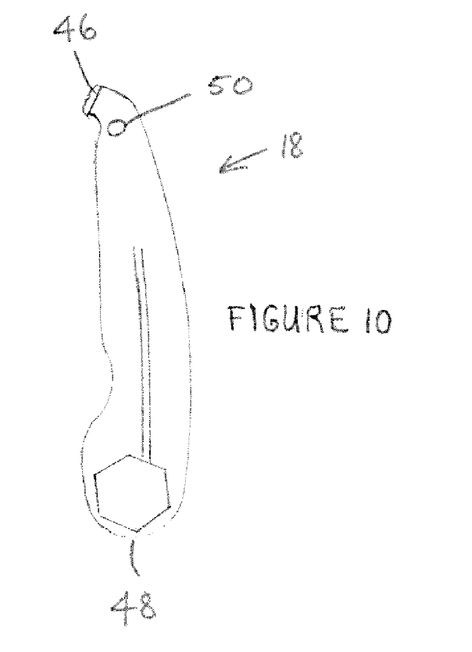
FIG. 10 is a schematic side view of the height indicator.

FIG. 10 is a schematic side view of the height indicator 18. The same reference numerals are used in FIG. 10 as those used in FIG. 9 for those components that are identical.

Except for the height indicator, the support arm is conventional and the height indicator can be used with support arms of various designs.

Figure 11:
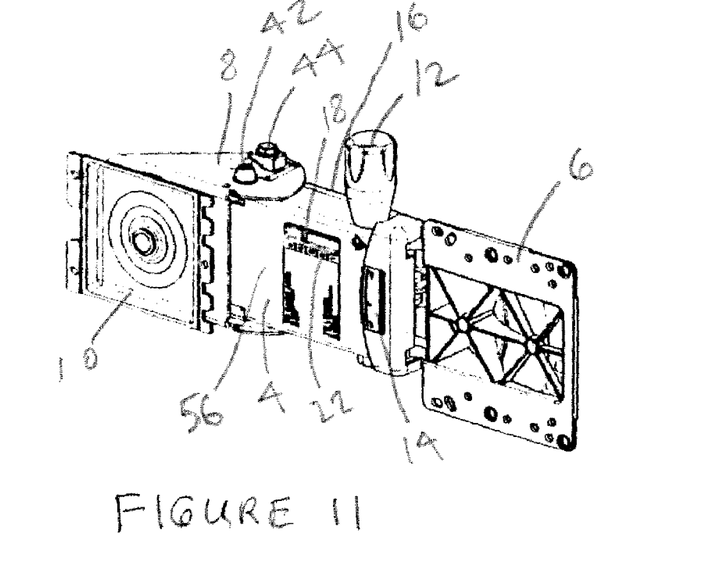
FIG. 11 is a perspective view of a further embodiment of a support arm having a height indicator thereon.
Figure 12:
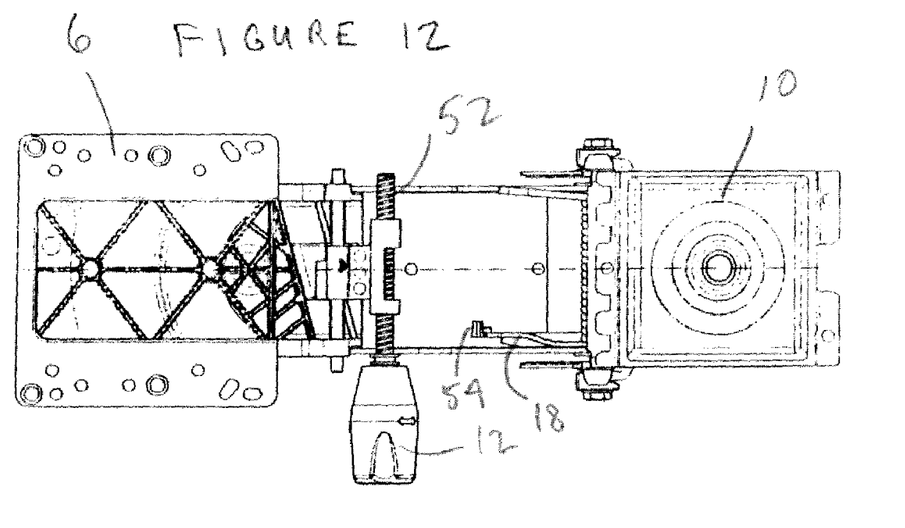
FIG. 12 is a top view of the support arm of FIG. 11 with a first elongated member removed to expose said height indicator.

In FIGS. 11 and 12, there is shown a perspective view and a top view with a first elongated member deleted. The same reference numerals are used in FIGS. 11 and 12 as those used in FIGS. 1-10 for those components that are identical. In FIG. 12, the first elongated member 4 has been deleted to expose a universal screw 52. It can be seen that the height indicator 18 is connected to the pivot axis 44 on the second elongated member 16 between the second elongated member and the bracket 10. When the first elongated member 4 is in place, a free end 54 of the height indicator 18 extends above an upper surface 56 shown in FIG. 1. The support arm 58 shown in FIGS. 11 and 12 operates slightly differently than the support arm shown in FIGS. 1-10. However, the different operation is not described as the height indicator in both embodiments is located in the same locations and operates in the same manner.

The workstation can be a desk, table, cabinet or any other work area to which it is desired to mount an articulating support arm. The base of the support arm is mounted beneath a working surface at the workstation.

I claim:

1. An articulating support arm for use in supporting one or more components at a workstation, said articulating support arm comprising a first elongated member with two ends and a base being pivotally connected at an inner end of one of said two ends, a platform being pivotally connected at an outer end of said two ends, a second elongated member pivotally connected to said platform beneath said first elongated member at an outer end and being connected to said base at an inner end, said platform and said base being connected to said elongated members so that an angle of said platform to said base remains substantially constant as said platform moves up or down relative to said base, said first elongated member having a mechanical height indicator thereon, said height indicator measuring a height of said platform and being slidable along said first elongated member.

2. An articulating support arm as claimed in claim 1 wherein said second elongated member is pivotally connected to said base.

3. An articulating support arm for use in supporting one or more components at a workstation, said articulating support arm comprising a first elongated member with two ends and a base pivotally connected at an inner end of one of said two ends, a platform being pivotally connected at an outer end of said two ends, a second elongated member being pivotally connected to said platform beneath said first elongated member at an outer end and being connected to said base at an inner end, said platform and said base being connected to said elongated members so that an angle of said platform to said base remains substantially constant as said platform moves up or down relative to said base, said first elongated member having a height indicator thereon, said height indicator measuring a height of said platform by measuring a distance that said first elongated member moves relative to said second elongated member as said platform moves up or down relative to said base, said height indicator member being pivotally affixed to said second elongated member.

4. An articulating support arm as claimed in claim 3 wherein said second elongated member is pivotally connected to said base.

5. An articulating support arm for use in supporting one or more components at a workstation, said articulating support arm comprising two elongated members located vertically apart from one another, said elongated members each having two ends and being pivotally connected at said ends to brackets connected to a base and a platform, said base and platform being at opposite ends of said elongated members, there being separate pivot axes at each end for each elongated member, said support arm having a height indicator thereon to measure a distance that said elongated members move relative to one another when said platform moves up or down relative to said base, said height indicator being pivotally affixed to one of said two elongated members and having an upper end extending to another of said two elongated members.

6. A support arm as claimed in claim 5 wherein said height indicator is located on an upper elongated member of said two elongated members.

7. A support arm as claimed in claim 6 wherein there is a scale on said upper elongated member and said height indicator is constructed to move along said scale during a full range of movement of said platform relative to said base.

8. A support arm as claimed in claim 7 wherein an upper end of said height indicator extends through a slot in said upper elongated member.

9. A support arm as claimed in claim 7 wherein said height indicator is pivotally affixed to a lower pivot axis of said two pivot axes at a base end of said elongated members, said indicator extending upward to a level that is slightly above said upper elongated member.

10. A support arm as claimed in claim 7 wherein said height indicator is pivotally affixed to a first pivot axis on a lower elongated member, said height indicator rotating about said first pivot axis as said platform moves up or down relative to said base and said first pivot axis simultaneously rotating about a second pivot axis through said upper elongated member as said platform moves up or down.

11. A support arm as claimed in claim 5 wherein said height indicator is pivotally affixed to a lower elongated member of said two elongated members, said lower elongated member pivoting relative to an upper elongated member when said platform moves up or down relative to said base, said height indicator being mounted to indicate a distance that said lower elongated member pivots relative to said upper elongated member.

12. A support arm as claimed in claim 5 wherein said height indicator is pivotally affixed to a lower elongated member at a pivot axis between said lower elongated member and said base.

13. An articulating support arm for use in supporting one or more components at a workstation, said articulating support arm comprising a first elongated member and a second elongated member located beneath said first elongated member, said elongated members being pivotally connected to first and second brackets at opposing ends of said elongated members, said first bracket being located at an inner end and being connected to a base, said second bracket being located at an outer end and supporting a platform, there being two separate pivot axes at each end, one pivot axis at each end being for each elongated member; said first elongated member having a height indicator thereon to measure a distance that first elongated member moves relative to said second elongated member when said platform moves up or down relative to said base, said height indicator being pivotally affixed to said second elongated member.

* * * * *